UNITED STATES PATENT OFFICE.

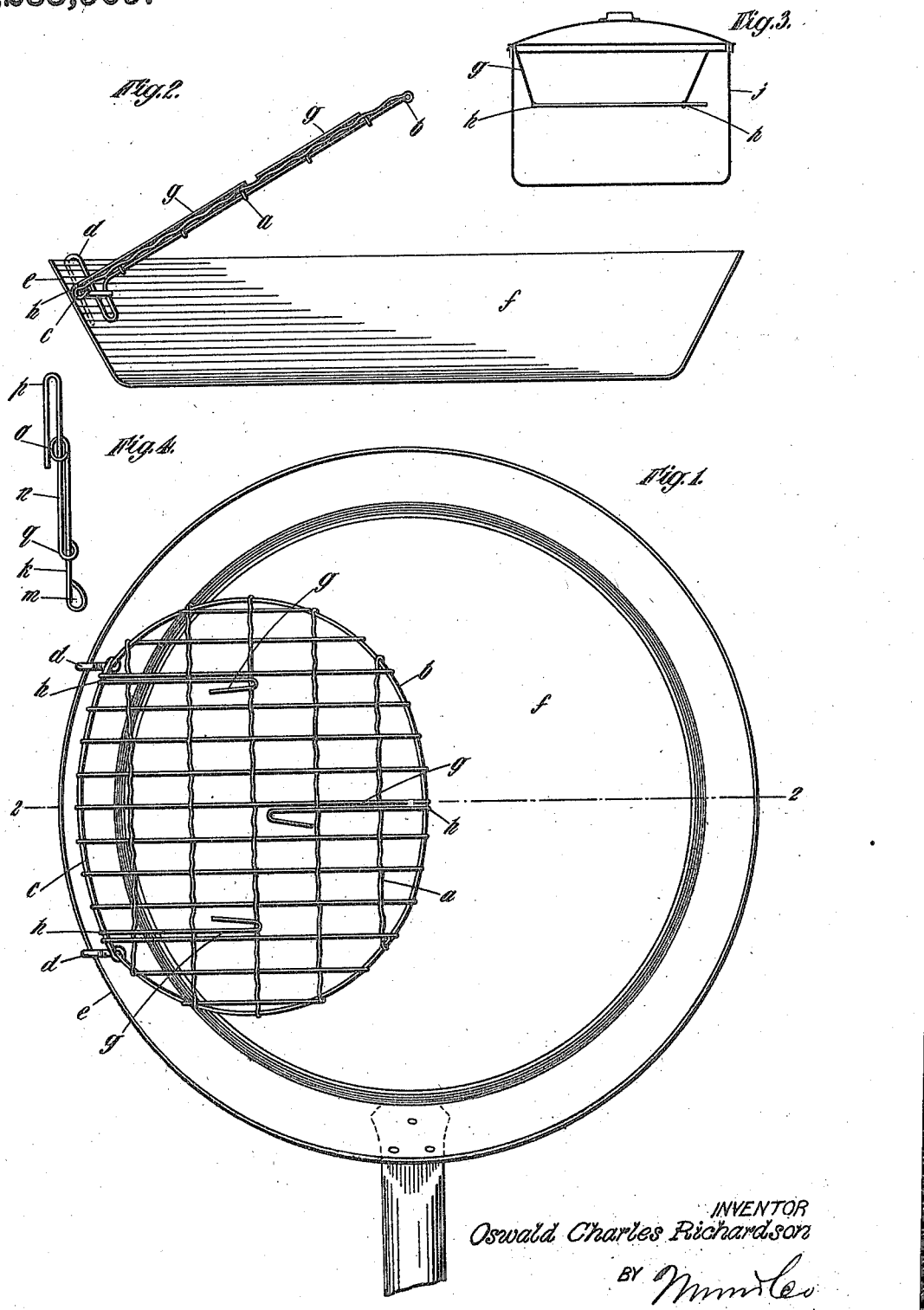

OSWALD CHARLES RICHARDSON, OF LONDON, ENGLAND.

GRID FOR FRYING-PANS AND THE LIKE.

1,233,909.  Specification of Letters Patent.  Patented July 17, 1917.

Application filed January 2, 1917. Serial No. 140,264.

*To all whom it may concern:*

Be it known that I, OSWALD CHARLES RICHARDSON, a subject of the King of Great Britain, and resident of 105ª Streatham Hill, London, England, have invented a certain new and useful Improvement in Grids for Frying-Pans and the like, of which the following is a specification.

This invention relates to a draining grid for use with frying pans, of the kind adapted to be supported by clips or hooks from the side of the pan, and has for its object to provide an improved device which, when in use for draining purposes, does not obstruct the use of the whole of the bottom of the pan for cooking purposes and which may also be used as a support for food to be cooked by steaming in a saucepan or the like in which water is being boiled.

A device constructed in accordance with this invention comprises a flat reticulated grid provided with hooks adapted to engage the side of a frying pan and whereby the grid may be supported in an inclined position over a portion of the pan with the lower edge of the grid below the level of the upper edge of the side of the pan, and also provided with hooks adapted to lie flat on the surface of the grid or to engage the upper edge of a saucepan or the like to support said grid in a substantially horizontal position between the upper edge and the bottom of the saucepan or the like.

Referring to the accompanying drawings, Figure 1 is a part plan of a frying pan showing, in position for use, one form of grid constructed in accordance with this invention. Fig. 2 is a cross section on the line 2—2, Fig. 1. Fig. 3 is a cross-sectional view showing the improved device in position in a saucepan for steaming purposes, and Fig. 4 is an elevation of a detail.

As shown in Figs. 1 and 2, the grid is constituted by wire netting or the like $a$ carried by a wire frame formed from two lengths of wire $b$, $c$ of which the wire $b$ extends along about three-quarters of the edge of the grid and the wire $c$ along the remainder. The wire $b$ is bent at its ends so as to extend at about right angles to the plane of the grid and each end is then bent back on itself to form a hook adapted to engage the side $e$ of a frying pan $f$ and to support the grid in an inclined position with its lower edge below the level of the upper edge of the side $e$, as shown in Fig. 2.

When the grid is placed in position as shown in Figs. 1 and 2, it is possible to cook food in the pan $f$ while food already cooked is on the grid for draining purposes, where it is kept hot, the inclined position of the grid being such that the whole of the bottom of the pan $f$ is visible and can be used without any difficulty.

In order that a grid constructed in accordance with this invention may also be used as a support for food which is to be cooked by steaming in a saucepan or the like, said grid is provided with auxiliary hooks $g$, loosely mounted by eyes $h$ on the frame of the grid. The free ends of the hooks $g$ are adapted to engage the upper edge of a saucepan $j$ as shown in Fig. 3, and to support the grid in a substantially horizontal position in said saucepan over water placed therein, thus permitting one article of food to be steamed during the boiling of other food, *e. g.* potatoes. When the grid is being used with a frying pan the hooks $g$ lie flat on said grid, as shown in Figs. 1 and 2, as the loose eyes $h$ lie in planes at right angles to the respective hooked portions.

In order that the depth at which the grid is supported in a saucepan may be varied, each hook may be made in two parts as shown in Fig. 4, the one part $k$ being formed at the one end with an eye $m$ and being bent at the other end around the other part $n$ as at $o$, the part $n$ being formed at one end with a hook $p$ and being bent at the other end around the part $k$ as at $q$. The two parts may be slid relatively to one another and are held in adjusted position by the friction therebetween.

I claim:

1. A draining grid for use with frying pans, comprising a flat reticulated grid provided with hooks extending upwardly from the plane of the grid, said hooks being adapted to support the grid from one side of a frying pan in an upwardly inclined position and constituting the sole support for said grid.

2. A draining grid for use with frying pans, comprising a flat reticulated grid provided with hooks extending upwardly from the plane of the grid, said hooks being adapted to support the grid from one side of a frying pan in an upwardly inclined position and constituting the sole support for said grid, said grid being also provided with hooks adapted to lie flat on the surface of the grid and also adapted to engage the upper edge of a pan and to support said grid in a substantially horizontal position between the upper edge and the bottom of the pan.

3. A draining grid for use with frying pans, comprising a flat reticulated grid provided with hooks extending upwardly from the plane of the grid, said hooks being adapted to support the grid from one side of a frying pan in an upwardly inclined position and constituting the sole support for said grid, said grid being also provided with hooks adapted to lie flat on the surface of the grid and also adapted to engage the upper edge of a pan and to support said grid in a substantially horizontal position between the upper edge and the bottom of the pan, each of said second-mentioned hooks being made in two parts slidable relatively to one another.

4. A draining grid for use with frying pans, comprising a flat reticulated grid provided with hooks extending upwardly from the plane of the grid, said hooks being adapted to support the grid from one side of a frying pan in an upwardly inclined position and constituting the sole support for said grid, said grid being also provided with hooks adapted to lie flat on the surface of the grid and also adapted to engage the upper edge of a pan and to support said grid in a substantially horizontal position between the upper edge and the bottom of the pan, each of said second-mentioned hooks being made in two parts, the one part being formed at one end with an eye and being bent at its other end around the other part, said other part being formed at one end with a hook and being bent at its other end around the first mentioned part.

OSWALD CHARLES RICHARDSON.

Copies of this patent may be obtained for five cents each, by addressing the "Commissioner of Patents. Washington, D. C."